(12) United States Patent
Naiki

(10) Patent No.: US 6,574,035 B2
(45) Date of Patent: Jun. 3, 2003

(54) DIFFRACTION OPTICAL DEVICE AND OPTICAL APPARATUS USING THE SAME

(75) Inventor: Toshio Naiki, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/012,551

(22) Filed: Dec. 12, 2001

(65) Prior Publication Data
US 2002/0071172 A1 Jun. 13, 2002

(30) Foreign Application Priority Data
Dec. 13, 2000 (JP) ........................................ 2000-378502

(51) Int. Cl.[7] ................................................ G02F 1/33
(52) U.S. Cl. ........................................ 359/305; 359/312
(58) Field of Search ................................ 359/305, 312, 359/285, 287

(56) References Cited

U.S. PATENT DOCUMENTS

| | | | |
|---|---|---|---|
| 3,582,838 A | * 6/1971 | Devries | 333/194 |
| 5,138,482 A | 8/1992 | Hatori et al. | 359/305 |
| 5,400,788 A | * 3/1995 | Dias et al. | 600/459 |
| 5,657,152 A | 8/1997 | Kadota | 359/305 |
| 5,953,027 A | 9/1999 | Suwabe et al. | 347/46 |

FOREIGN PATENT DOCUMENTS

| | | |
|---|---|---|
| JP | 5-107480 | 4/1993 |
| JP | 10-319446 | 12/1998 |

* cited by examiner

Primary Examiner—Georgia Epps
Assistant Examiner—William Choi
(74) Attorney, Agent, or Firm—Morrison & Foerster LLP

(57) ABSTRACT

An acoustooptic device is structured by providing an interdigital transducer in which arch-shaped electrode fingers are interdigitated so that the interdigital transducer is circular or annular in shape as a whole, on an optical waveguide which is circular when viewed from the front. This acoustooptic device is used as a diffraction optical device on which light is incident from the front. When an alternating voltage of a predetermined frequency is applied to the interdigital transducer by an oscillator, a concentric acoustic compressional wave is generated on the optical waveguide. The concentric acoustic compressional wave diffracts the incident light, so that the diffraction optical device functions like a lens and converges the luminous flux.

22 Claims, 7 Drawing Sheets

DIFFRACTION OPTICAL DEVICE AND OPTICAL APPARATUS USING THE SAME

The present application claims priority to Japanese Patent Application No. 2000-378502 filed Dec. 13, 2000, the entire content of which is hereby incorporated by reference.

BACKGROUND OF THE INVENTION

1. Field of the Invention

The present invention relates to an optical apparatus using an acoustooptic device.

2. Description of the Related Art

Various kinds of acoustooptic devices made of lithium niobate $LiNbO_3$ or the like have been proposed. For example, U.S. Pat. No. 5,657,152 discloses an acoustooptic device in which on an $LiNbO_3$ substrate, an optical waveguide layer having a higher light refractive index than the $LiNbO_3$ substrate is formed and a Rayleigh wave, which is a kind of surface acoustic wave, is excited on the optical waveguide layer to thereby deflect light. U.S. Pat. No. 5,138,482 discloses a light modulator in which a light beam is divided into a plurality of beams by use of an optical waveguide made of a material capable of propagating surface elastic waves and the difference in modulation timing among a plurality of light beams is eliminated.

The above-described conventional optical devices use an interdigital transducer (hereinafter, abbreviated as IDT) to deflect light. The basic structure of the IDT is shown in FIG. 1. In the IDT 101, a comb-shaped electrode 102a having a plurality of linear electrode fingers 103a and a comb-shaped electrode 102b having a plurality of linear electrode fingers 103b are opposed to each other so that the electrode fingers 103a and 103b are interdigitated. An oscillator 104 applies a voltage of a predetermined frequency to the comb-shaped electrodes 102a and 102b.

FIG. 2 shows the IDT 101 formed on an optical waveguide layer 105. When the voltage of the predetermined frequency is applied to the IDT 101 by the oscillator 104, a surface acoustic wave 106 is generated on the optical waveguide layer 105. When a light beam is incident on the optical waveguide layer 105, the surface acoustic wave 106 diffracts a light beam 107 as schematically shown in FIG. 3. The angle of diffraction depends on the frequency and the elastic modulus of the optical waveguide layer 105.

However, the conventional optical devices are capable of deflecting light only within the same plane.

SUMMARY OF THE INVENTION

A principal object of the present invention is to provide a diffraction optical device having a light condensing property like that of a lens by using an acoustooptic device.

Another object of the present invention is to provide an optical apparatus in which the focal length is easily adjusted.

These and other objects are attained by a diffraction optical device comprising an optical waveguide made of an acoustooptic material, an interdigital transducer provided on the optical waveguide and in which a plurality of arc-shaped electrode fingers are interdigitated so that the interdigital transducer is substantially circular in shape as a whole, and an oscillator device for applying a voltage of a predetermined frequency to the interdigital transducer.

The substantially circular shape includes a circle, an annular shape, and a circle and an annular shape a part of which is cut away.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
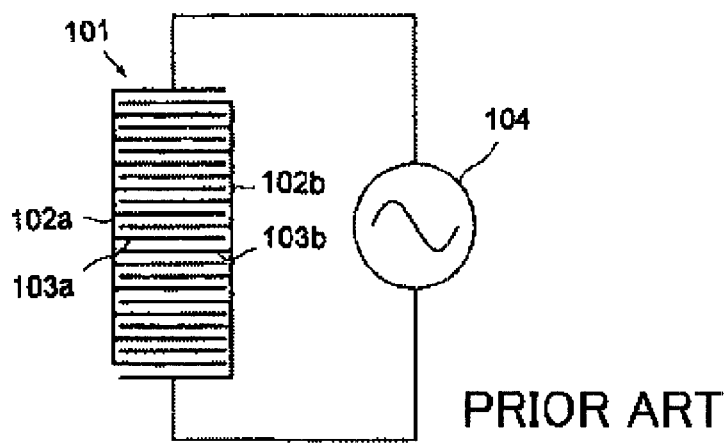
FIG. 1 is a schematic view showing the basic structure of the interdigital transducer in the conventional acoustooptic devices.
Figure 2:
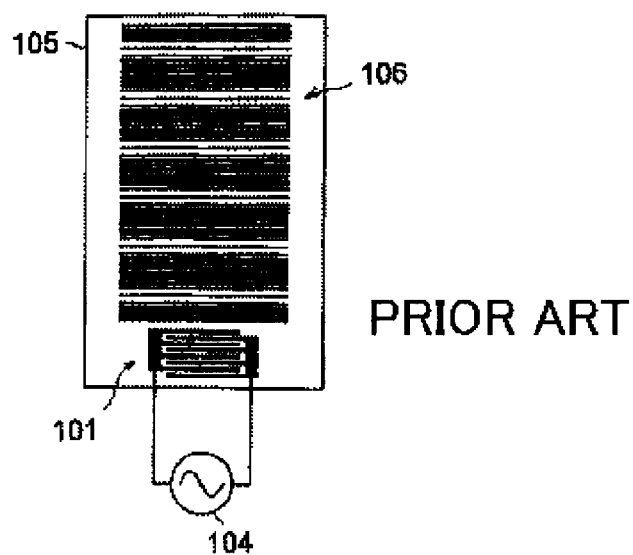
FIG. 2 is a front view briefly showing the structure of the conventional acoustooptic devices.
Figure 3:
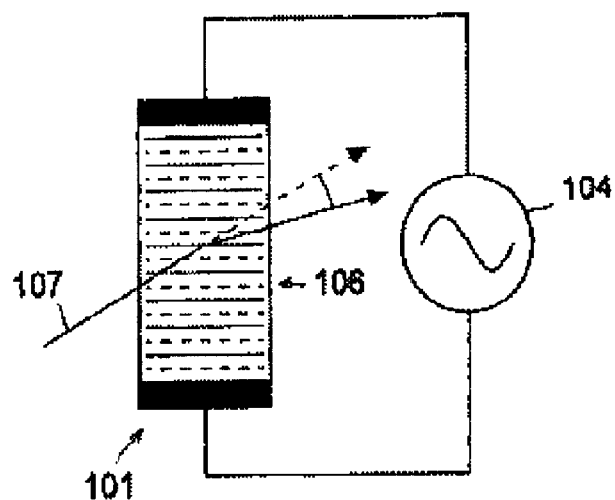
FIG. 3 is a schematic view showing a condition where the interdigital transducer in the conventional acoustooptic devices generates a surface acoustic wave.
Figure 4:
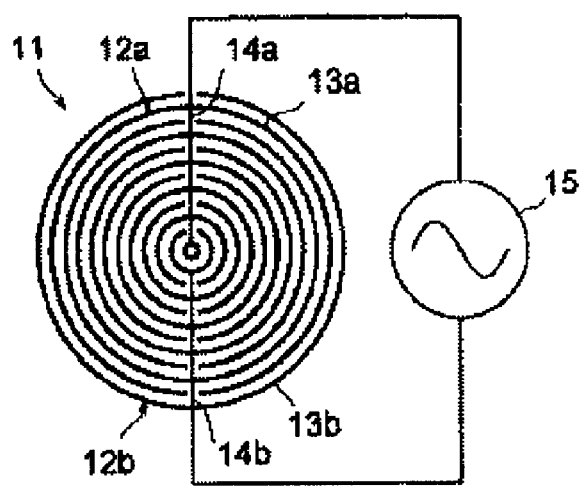
FIG. 4 is a front view showing the basic structure of an interdigital transducer of a diffraction optical device of the present invention.

FIG. 4 shows the basic structure of the above-described novel IDT. The IDT 11 has comb-shaped electrodes 12a and 12b. The comb-shaped electrodes 12a and 12b have the same number of plural electrode fingers 13a and 13b. The electrode fingers 13a and 13b are not linear but arc-shaped. In this case, the arc shape is a circle a part of which is cut away, and is close to a circle. The arc-shaped electrode fingers 13a and 13b are concentrically arranged so that the positions of the cut-away parts are the same in angle. Linear electrode basic portions 14a and 14b extending along the diameters of the arcs are provided in positions 180 degrees away from the cut-away parts. The electrode basic portions 14a and 14b pass through the centers of the plural electrode fingers 13a and 13b to thereby electrically connect them.

The comb-shaped electrodes 12a and 12b are combined so that the electrode fingers 13a and 13b are interdigitated. The electrode basic portions 14a and 14b pass through the cut-away parts of the electrode fingers 13b and 13a, respectively. In the case of FIG. 4, the electrode finger 13a having the smallest diameter of the electrode fingers 13a of the comb-shaped electrode 12a is situated at the innermost, and this electrode finger 13a no longer has a cut-away part but has a closed circular shape. The electrode finger 13b having the largest diameter of the electrodes fingers 13b of the comb-shaped electrodes 12b encircles all. Thus, the IDT 11 is substantially circular as a whole. As is apparent from FIG. 7, the electrode fingers 12a, 12b, 13a and 13b are arranged in a direction vertical to the optical axis of a diffraction optical device 1a.

Figure 5:
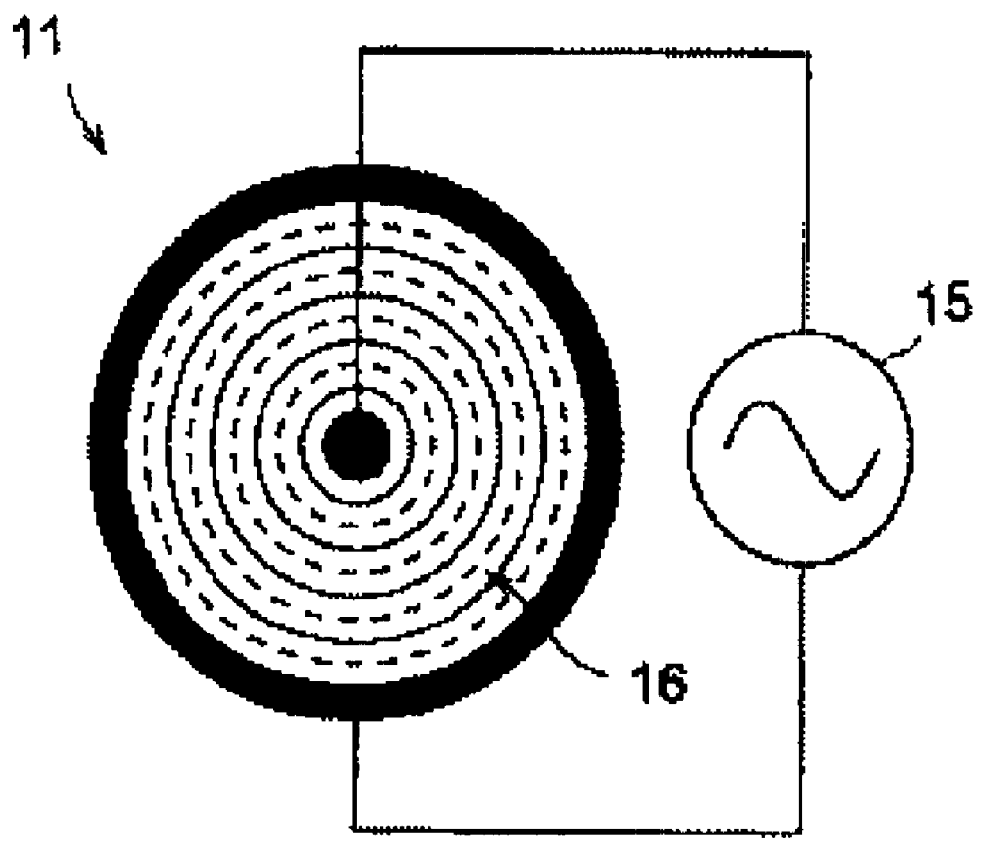
FIG. 5 is a schematic view showing a condition where the interdigital transducer of the diffraction optical device of the present invention generates an acoustic compressional wave.

When an alternating voltage of a predetermined frequency is applied to the comb-shaped electrodes 12a and 12b by an oscillator 15, as schematically shown in FIG. 5, a concentric compressional wave is generated due to surface elasticity. Since the oscillator 15 applies a frequency in the acoustic frequency band, an acoustic compressional wave 16 is generated. When light is incident from a direction perpendicular to the plane of the figure under this state, a diffraction phenomenon occurs in the direction perpendicular to the plane of the figure. The angle of diffraction depends on the frequency and the elastic modulus of the substrate.

By generating a concentric acoustic compressional wave as described above, a usage such that the luminous flux incident on the optical waveguide layer is converged becomes possible, so that the device can perform the function as an axicon prism or a Fresnel's zone plate.

Figure 6:
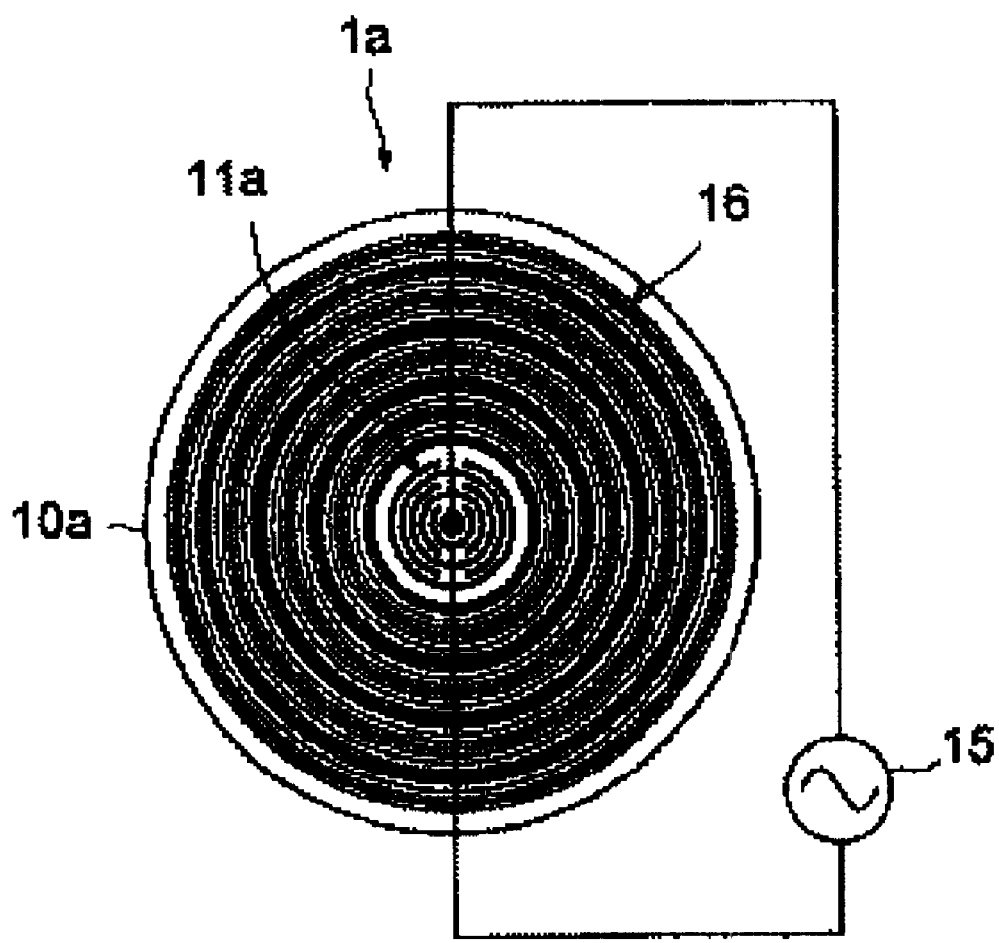
FIG. 6 is a front view briefly showing the structure of a first embodiment of the diffraction optical device of the present invention.

FIG. 6 shows a first embodiment of the diffraction optical device of the present invention. Reference number 1a represents a diffraction optical device having an optical waveguide layer 10a that is circular when viewed from the front. The optical waveguide layer 10a made of $LiNbO_3$ has a thin plate form, and the elastic modulus distribution is uniform over the entire area. An IDT 11a having a structure similar to that shown in FIG. 4 is formed in the center of the optical waveguide layer 10a. The oscillator 15 is connected to the IDT 11a.

Figure 7:
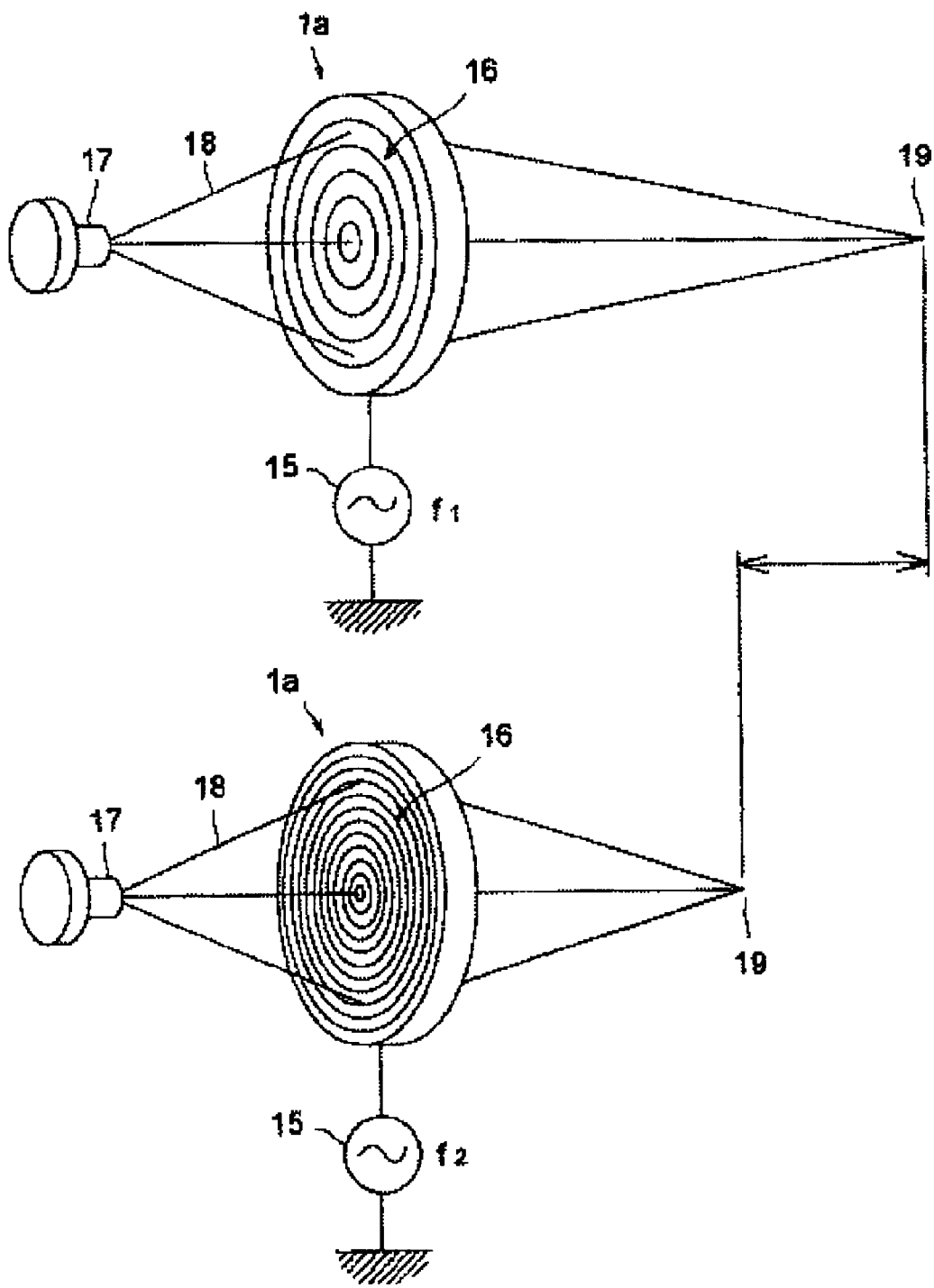
FIG. 7 is a perspective view schematically showing the working of an optical apparatus using the diffraction optical device of the present invention.

The diffraction optical device 1a functions in the following manner: When a voltage of a frequency of an acoustic wave level is applied to the IDT 11a by the oscillator 15, a concentric acoustic compressional wave 16 is generated outside the IDT 11a. When light is incident from a direction perpendicular to the plane of the figure under this state, a diffraction phenomenon occurs in the direction perpendicular to the plane of the figure. FIG. 7 schematically shows an optical apparatus which projects light emitted from a light source to a surface through the diffraction optical device 1a. A luminous flux 18 applied from a light source 17 to a diffraction optical device 1 is diffracted at the part of the acoustic compressional wave 16 and converged. Particularly, since the concentric acoustic compressional wave is generated outside the IDT 11a, a large-area luminous flux can be converged. The distance to the focal point 19 varies according to the frequency oscillated by the oscillator 15. In the upper view of FIG. 7, the oscillation frequency of the oscillator 15 is $f_1$, and in the lower view, the oscillation frequency is $f_2$. The frequency $f_2$ is higher than the frequency $f_1$. Therefore, the pitch of the acoustic compressional wave 16 is low. The low pitch of the acoustic compressional wave 16 increases the angle of diffraction, and the distance to the focal point 19 is shorter than that in the case of the upper view.

Since the elastic modulus distribution of the optical waveguide layer 10a is uniform, the pitch of the acoustic compressional wave 16 is constant. In this case, the diffraction optical device 1a is provided with a function equal to that of a refractive axicon prism (conical prism), and can be used for generating a Bessel beam (non-diffracted beam). The Bessel beam has a characteristic that the distribution does not expand even when the beam travels in the direction of propagation. That is, the depth of focus is extremely large in the optical system. The pitch of the acoustic compressional wave 16 changes by changing the applied frequency, and this corresponds to changing the vertical angle of the axicon prism.

Figure 8:
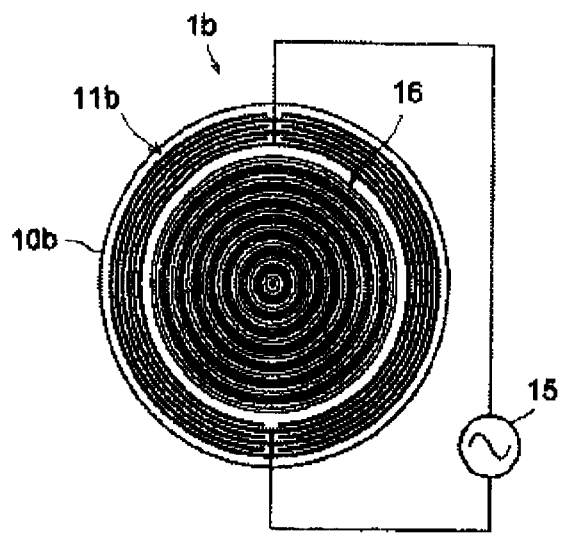
FIG. 8 is a front view briefly showing the structure of a second embodiment of the diffraction optical device of the present invention.

FIG. 8 shows a second embodiment of the present invention. The diffraction optical device 1b of this embodiment also has an optical waveguide layer 10b that is circular when viewed from the front and in which the elastic modulus distribution is uniform. An annular IDT 11b is formed in the periphery of the optical waveguide layer 10b. When a voltage of a frequency of an acoustic wave level is applied to the IDT 11b by an oscillator 15, a concentric acoustic compressional wave 16 is generated inside the area surrounded by the IDT 11b. The function of the diffraction optical device 1b is similar to that of the diffraction optical device 1a of the first embodiment. However, light more easily passes through the central part because the IDT is not situated in the center. In addition, the central part of the luminous flux as well as the remaining part thereof can be converged.

Figure 9:
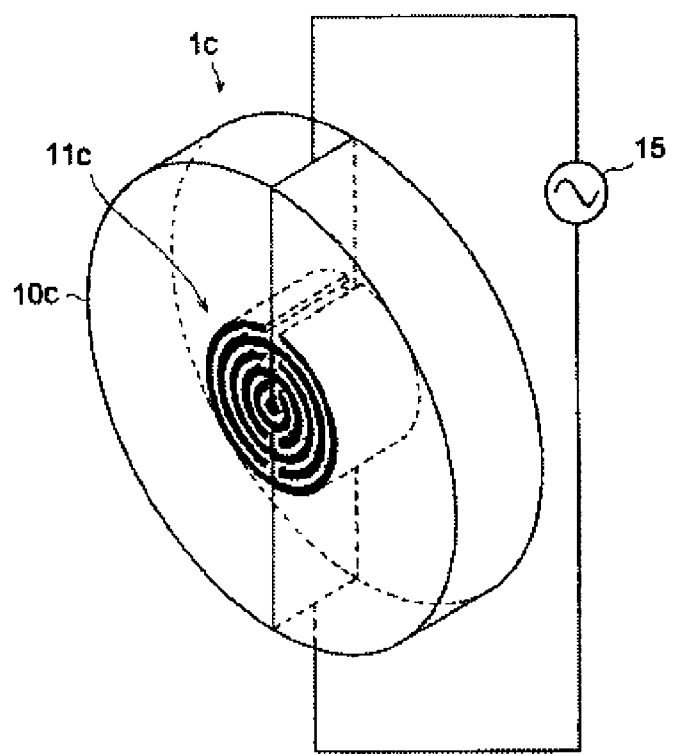
FIG. 9 is a perspective view briefly showing the structure of a third embodiment of the diffraction optical device of the present invention.

FIG. 9 shows a third embodiment of the present invention. The diffraction optical device 1c of this embodiment also has an optical waveguide layer 10c that is circular when viewed from the front and in which the elastic modulus distribution is uniform. Like in the first embodiment, an IDT 11c is formed in the center of the optical waveguide layer 10c. When a voltage of a frequency of an acoustic wave level is applied to the IDT 11c by an oscillator 15, like in the diffraction optical device 1a of the first embodiment, a concentric acoustic compressional wave is generated outside the IDT 11c. The optical waveguide layer 10c of the diffraction optical device 1c is a so-called bulk type having its thickness in a direction vertical to the direction of propagation of the acoustic compressional wave. With this structure, power density is distributed, so that photodegradation is significantly reduced.

Figure 10:
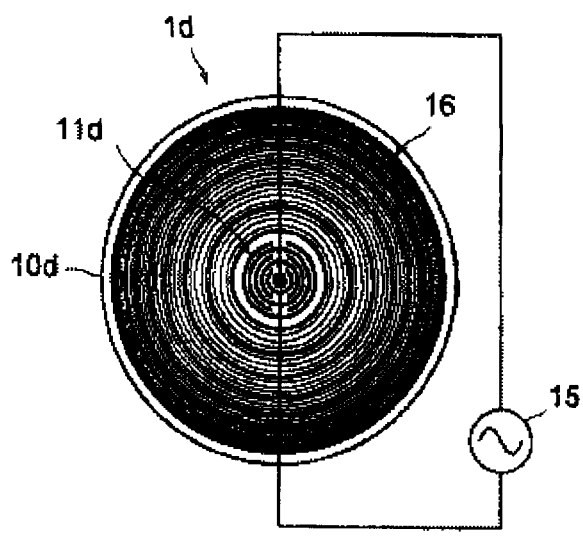
FIG. 10 is a front view briefly showing the structure of a fourth embodiment of the diffraction optical device of the present invention.

FIG. 10 shows a fourth embodiment of the present invention. The diffraction optical device 1d of this embodiment also has an optical waveguide layer 10d that is circular when viewed from the front, and like in the first embodiment, an IDT 11d is formed in the center of the optical waveguide layer 10d. In this case, however, the elastic modulus distribution of the optical waveguide layer 10d is not uniform. The elastic modulus distribution of the optical waveguide layer 10d has a gradient so that the elastic modulus increases from the center to the edge along the radius. Varying the elastic modulus distribution like this can be realized, for example, by a method such that a material with a high density (specific gravity) is doped into the base material of the acoustooptic material like when a gradient index lens is manufactured.

When a voltage of a frequency of an acoustic wave level is applied to the IDT 11d by an oscillator 15, a concentric acoustic compressional wave 16 is generated outside the IDT 11d. Since the elastic modulus increases from the center to the edge along the radius, the pitch of the acoustic compressional wave 16 decreases with distance from the center of the optical waveguide layer 10d. Consequently, the diffraction optical device 1d functions as a so-called Fresnel's zone plate and can be used as a lens.

Figure 11:
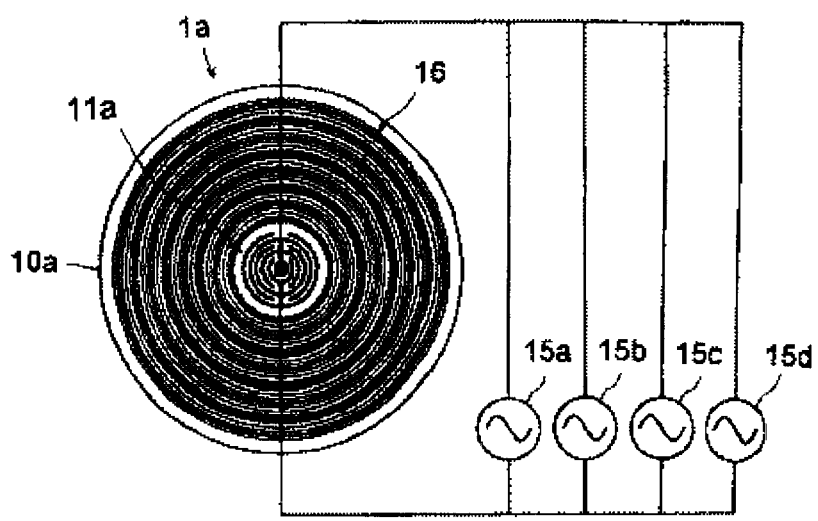
FIG. 11 is a front view briefly showing the structure of a fifth embodiment of the diffraction optical device of the present invention.

FIG. 11 shows a fifth embodiment of the present invention. Although the diffraction optical device 1a of the first embodiment is illustrated in FIG. 11, this embodiment is not limited thereto; any one of the diffraction optical devices 1b, 1c and 1d of the second to the fourth embodiments may be used. The point of the fifth embodiment is provision of a plurality of oscillators having different oscillation frequencies. In FIG. 11, four oscillators 15a, 15b, 15c and 15d are provided. The oscillators 15a, 15b, 15c and 15d are connected in parallel to the IDT 11a, and one of them is selectively used to obtain an acoustic compressional wave 16 of a desired pitch. By doing this, the focal length can be stepwisely changed.

Although not shown, the following can be structured as a sixth embodiment: In the first to the fourth embodiments, an oscillation frequency continuously variable type oscillator is used as the oscillator 15. By doing this, the frequency can be steplessly changed to thereby steplessly adjust the focal length. Consequently, the diffraction optical device can be used as a device for automatic focusing having no movable portion.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. A diffraction optical device comprising:

an optical waveguide made of an acoustooptic material;

an interdigital transducer provided on the optical waveguide and having a plurality of arc-shaped electrode fingers that are interdigitated so that the interdigital transducer is substantially circular in shape as a whole; and an oscillator device for applying a voltage of a predetermined frequency to the interdigital transducer, wherein the optical device is configured to converge a luminous flux projected thereto by diffracting the luminous flux using an acoustic compressional wave generated by the interdigital transducer.

2. The diffraction optical device according to claim 1, wherein the acoustic compressional wave is generated in the optical wave guide.

3. The diffraction optical device according to claim 2, wherein the compressional wave is generated outside the interdigital transducer.

4. The diffraction optical device according to claim 2, wherein the compressional wave is generated inside the area surrounded by the interdigital transducer.

5. The diffraction optical device according to claim 1, wherein an elastic modulus distribution of the optical waveguide is uniform.

6. The diffraction optical device according to claim 1, wherein an elastic modulus distribution of the optical waveguide has a gradient.

7. The diffraction optical device according to claim 6, wherein the elastic modulus distribution increases from the center of the concentric compressional wave to the edge.

8. The diffraction optical device according to claim 1, wherein the oscillator device applies voltages of a plurality of frequencies.

9. The diffraction optical device according to claim 8, wherein the oscillator device includes a plurality of oscillators having different oscillation frequencies.

10. A diffraction optical element comprising:

an optical waveguide made of an acoustooptic material; and an interdigital transducer provided on the optical waveguide and having a plurality of arc-shaped electrode fingers that are interdigitated so that the interdigital transducer is substantially circular in shape as a whole, wherein the optical element is configured to converge a luminous flux projected thereto by diffracting the luminous flux using an acoustic compressional wave generated by the interdigital transducer.

11. The diffraction optical element according to claim 10, wherein an elastic modulus distribution of the optical waveguide is uniform.

12. The diffraction optical element according to claim 10, wherein an elastic modulus distribution of the optical waveguide has a gradient.

13. The diffraction optical element according to claim 12, wherein the elastic modulus distribution increases from the center of the acoustic compressional wave to the edge.

14. The diffraction optical element according to claim 10, wherein the plurality of electrode fingers are arranged in a direction vertical to the optical axis of the diffraction optical element.

15. An optical apparatus configured to project light emitted from a light source to a surface through a diffraction optical device, the diffraction optical device comprising:

an optical waveguide made of an acoustooptic material;

an interdigital transducer provided on the optical waveguide and having a plurality of arc-shaped electrode fingers which are interdigitated so that the interdigital transducer is substantially circular in shape as a whole; and an oscillator device for applying a voltage of a predetermined frequency to the interdigital transducer, wherein the diffraction optical device is configured to converge a luminous flux projected thereto by diffracting the luminous flux using an acoustic compressional wave generated by the interdigital transducer.

16. The optical apparatus according to claim 15, wherein the acoustic compressional wave is a concentric acoustic compressional wave generated outside the interdigital transducer.

17. The optical apparatus according to claim 15, wherein the acoustic compressional wave is a concentric acoustic compressional wave generated inside an area surrounded by the interdigital transducer.

18. The optical apparatus according to claim 15, wherein the oscillator device applies voltages of a plurality of frequencies.

19. The optical apparatus according to claim 15, wherein a part of each of the electrode fingers is cut away, a plurality of electrode fingers are concentrically arranged so that the positions of the cut-away parts are the same in angle.

20. The optical apparatus according to claim 19, further comprising linear electrode basic portions extending along the diameters of the arcs in positions 180 degrees away from the cut-away parts of the finger electrodes.

21. The optical apparatus according to claim 20, wherein electrode basic portions electrically connects the plurality the finger electrodes.

22. The optical apparatus according to claim 15, wherein the plurality of the finger electrodes are arranged in a direction vertical to the optical axis of the diffraction optical device.

* * * * *

UNITED STATES PATENT AND TRADEMARK OFFICE
CERTIFICATE OF CORRECTION

PATENT NO. : 6,574,035 B2
DATED : June 3, 2003
INVENTOR(S) : Toshio Naiki

It is certified that error appears in the above-identified patent and that said Letters Patent is hereby corrected as shown below:

Column 6,
Line 58, after "plurality", add -- of --.

Signed and Sealed this

Fourteenth Day of October, 2003

JAMES E. ROGAN
*Director of the United States Patent and Trademark Office*